June 24, 1930.   A. O. AUSTIN   1,766,869
INSULATOR BUSHING
Filed July 29, 1922
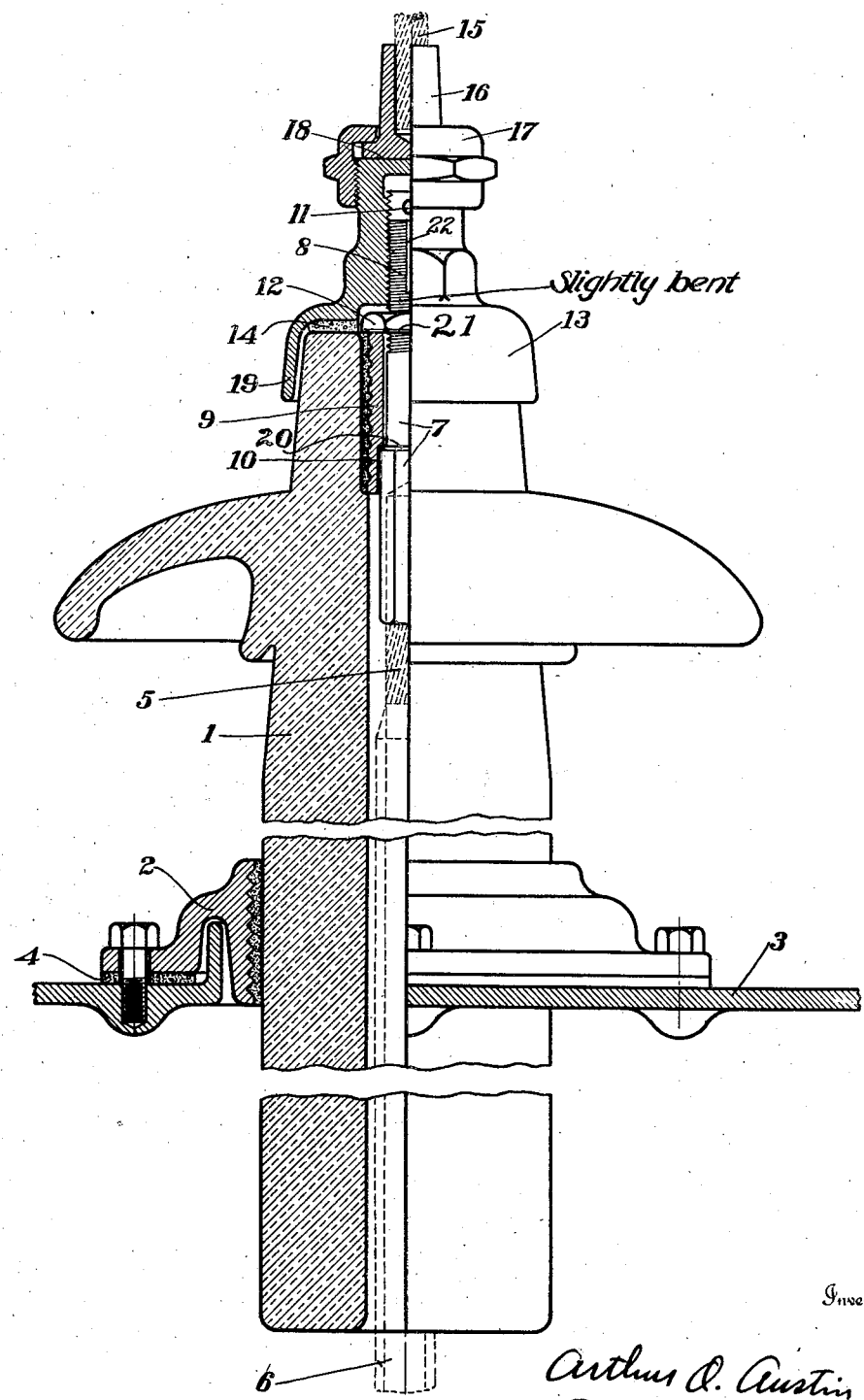
Inventor
Arthur O. Austin
By Nissen & Crane
Attorney Patented June 24, 1930

1,766,869

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

INSULATOR BUSHING

Application filed July 29, 1922. Serial No. 578,467.

This invention relates to bushings for conductors where they enter a housing such as that of a transformer, or for other purposes where an insulator of this nature is required. The object of the invention is to provide a bushing which shall exclude water from the interior of the casing, which shall provide good electrical connection for the conductor, which may be easily installed or removed without disturbing the connections of the conductor within the housing and which shall be of improved construction and operation. The invention is particularly applicable to transformer bushings.

The invention is exemplified in the combination and arrangement of parts shown in the accompanying drawing and described in the following specification, and it is more particularly pointed out in the appended claims.

In the drawing the figure is part elevation and part section of one form of the invention.

With the improved type of terminal, it is possible to produce an air tight joint so that the oil head within the transformer casing may be above the top of the bushing or terminal, and at the same time means are provided so that the bushing may be removed or replaced without the necessity of changing connections below the top of the transformer casing. The terminal also permits the use of an insulated covering between the conductor and the wall of the bushing. This latter gives an increased dielectric strength, and may be particularly important in preventing a flashover from the conductor at the lower end of the bushing as well.

Should the oil level become low and expose the lower end of the bushing, this insulation over the conductor may prevent a discharge to the transformer case or ground from the lead or conductor under severe conditions. The terminal is also constructed so that there are no joints permitting the direct leakage of water from rain into the center of the bushing and from there into the transformer where it will be likely to cause considerable trouble.

A further object of the terminal is to provide means for attaching the outside lead so that the bushing may be removed or replaced without unsoldering joints. This connection must make good electrical contact so as to minimize $I^2R$ losses and the generation of heat which might endanger the bushing or leads.

In the drawing is shown a bushing having a main insulating member 1 attached to a flange 2. The flange 2 is bolted to the transformer case 3 so as to provide a tight joint, a gasket 4 being used between the flange 2 and the case 3. The conductor 5 with an insulated covering 6 extends thru the center of the bushing for the conduction of current. The conductor 5 may be a cable, rod, tube or other form of conductor suitable for the purpose. The upper end of this conductor 5 may be formed into a suitable shape which will be described later, or it may be attached to a holding member 7 by soldering, brazing, screwing to same, or other suitable means which will provide electrical and mechanical connections. The upper portion of the member 7 is provided with a threaded portion 8 of such size that it will go thru a hole in a bushing member 9 or sleeve. This latter is preferably made of metal and cemented or attached to the body member 1. The lower end of the member 9 is provided with an angular recess 10 so that it will prevent the rotation of member 7 which is shaped to fit the recess. This recess is preferably made so it will form a shoulder in the piece 9 to prevent the piece 7 from being drawn up thru the bushing. The extreme end of the piece 7 is provided with an eye or a hole 11 for attaching a wire or string so that the lead may be drawn up thru the bushing from below. The string or wire is first threaded thru the bushing so that when the bushing is lowered into place the lead may be drawn up thru same. When the bushing is in place the upper end of the member 7 will project thru the insert 9. A nut 12 is then screwed down until the lower portion of the member 7 strikes against the shoulder in the insert member 9.

It is evident that the hexagonal or angular portion of the member 7 engaging in the recess 10 permits the nut to be tightened in place, without danger of twisting the lead 5 which might cause the lower end to be displaced or loosened. The nut 12 is larger than the opening in the member 9 and therefore, cannot be accidentally dropped into the transformer as in the case of the small pin which has heretofore been used. The main cap 13 can then be screwed down on the threaded end 8. A suitable gasket 14 is placed on the end of the bushing between it and the member 13 so that when the member 13 is screwed down, the gasket will be clamped tightly between the member 13 and the bushing.

As the upper end of the member 13 is continuous, water cannot enter at that point, and the joint at the lower end of the member is sealed by the gasket 14. The gasket may be of cork or an asbestos filled copper ring or other suitable form. The end of the bushing is preferably made smooth, so that the gasket will slide in tightening down the main cap 13. The threaded end of the member 8 is of such length that it will not bottom in the recess of the member 13. This permits of the main member 13 being drawn down tightly against the gasket to form the seal. Whatever pressure is exerted on the gasket must be taken up by the threaded surface 8 which is an advantage, as it will increase the effectiveness of the electrical contact.

As the member 7 is prevented from rotation, it is possible to provide a snug fit between the threaded end and the cap member 13 to provide good electrical contact. Where it is desired to have the terminal go on easily, and where it is difficult to provide close fittings for electrical contact or where it is not necessary to provide a tight joint between the cap member 13 and the main bushing, electrical contact between the cap member 13 and the threaded end 8 may be insured by giving the threaded member a slight bend after forming. The spring in the member will insure contact between the sides, even tho the thread does not fit closely.

Another method is to slot the member before threading. This permits the portions on each side of the slot to spring in slightly during the threading operation. When the cap member is screwed in place, it is evident that the tendency to spring outwardly on each side of the slot will insure contact, and at the same time permit a loose fitting thread. Another way to provide a good electric contact and at the same time have considerable latitude for the screw connections, is to slot the threaded member and then spread same slightly.

It is necessary to provide a connection for the line 15 running away from the transformer. Unless this line is attached by a removable lug, it is evident that it will have to be twisted up when the cap member 13 is screwed in place. In order to provide an efficient connection, and one which is in line with the axis of the bushing, a socket member 16 is provided which may be attached to the end of the conductor 15. This lug 16 is provided with a machined surface so that it may make contact with the end of the cap member 13. In order to insure contact between the lug 16 and the cap member 13, it is necessary to provide means 17 for clamping these two members together, but which will not necessitate rotating either. This member 17 provides additional electrical contact where it bears on the extended portion of the lug 16. By making this portion conical, it is possible to provide an increased contact surface. If a piece of yielding material 18 such as tin is placed between the contact surface between the lug 16 and the cap 17 it is not necessary to provide a fine finish.

Another method of insuring contact, is to provide a deformed piece of spring brass or bronze which will give a large number of small contacts.

Still another method is to use a piece of wire screen of good conductivity which will give a number of points of contact.

As the portion of the conductor under tension is comparatively short, it is evident that elongation due to heat expansion and consequent tendency to loosen the pressure on the gasket, or on the electrical contact will be comparatively small as compared to that where the main conducting lead is held at the lower end of the bushing.

It is evident that the construction as outlined, permits the soldering of the lead 15 into the terminal 16, while same is removed from the bushing. This prevents heat from damaging the bushing, contact surfaces, or gasket which might be the case if the lug 16 were integral with the member 13. If it is desired to remove the bushing to prevent breakage in shipment, or for replacement, it is necessary to first unscrew the nut 17. This frees the upper end of the bushing from the lead 15. The cap member 13 is next unscrewed, the lead 15 being prevented from rotation as previously explained.

As there is clearance between the nut 12 and the sealing cap 13, the nut 12 will not be unscrewed when the cap is removed. The nut 12 holds the lead from dropping back into the transformer where it might be difficult to get a hold of same for replacement. A string, wire, rod or other suitable member is then attached to the member 7 by the hole 11. This attached member must be such that it will go thru the opening in the member 9 and should preferably go thru the nut 12, so it will not be necessary to remove the nut before attaching to the eye 11. The nut is then removed and the bushing may be lifted out of the transformer case by removing the clamping bolts on the attached flange 2. As the bushing is withdrawn, the cord, wire or other member attached to the eye in the member 7 is fed down thru the bushing. This cord or member should be of sufficient length so that it or the lead 5 may be grasped above the top of the transformer case when the bushing has been removed sufficiently.

To install the bushing, the operation is carried out in reversed order. It is evident that the terminal permits the removal or installation of the bushing without the necessity of making connections other than at the top of the bushing, and that it is not necessary to disturb the transformer leads in any manner. Neither is it necessary to lower the oil level to see that connections are properly made to the inside terminals of the transformer. In addition, means are provided so that the moisture cannot enter. Means are also provided, so that the bushing may be operated under a static head of liquid, either from the inside or outside since the joints are liquid tight and will withstand either interior pressure or pressure from the outside such as might occur from floods, ice formation on the top of a transformer or other weather conditions.

It sometimes happens that snow and ice build up on the top of the bushing or transformer to a height above the top of the bushing. The heat from the lead may melt the snow or ice around the central portion. The water from the melted ice may be held back by the snow or ice which is further out on the bushing and which may be still frozen. In this manner a hydro-static head may be placed on the bushing so that the drip lip 19 alone on the sealing cap 13 would not prevent the entrance of water. Cases have also occurred, where transformers have been entirely immersed during flood conditions and it is desirable to prevent the entrance of water which would seriously damage the transformer.

It is evident that the construction is such that a tight joint may be obtained without depending on a cemented joint, as the weather cap 13 tightens up on a gasket 14 which bears directly on the dielectric member. Even if there is a leak, same may always be stopped by putting in a new gasket or tightening up the cap. Where tightness depends on a cemented joint, trouble may result, as it is difficult to maintain a tight joint owing to difference in expansion between the cap and dielectric, particularly where the joint is several inches in diameter.

The joint between the insert 9 and the wall of the bushing is of small diameter and easily made so that it can usually be depended upon for tightness as compared to large joints. In addition, the bushing 9 being on the inside any expansion of same tends to tighten the joint. As the danger of leakage is greatest when the bushing is hot and the oil thin and most likely to leak, this is important, and a great improvement over a cap cemented on the outside which may open and leak due to expansion.

By providing a gasket or other type of tight joint such as a cone at 20 or between the nut 12 and insert 9, two further seals may be provided. Either of these seals are usually sufficiently good to insure a tight joint. Where high pressures are encountered a gasket at 20 or a cone is very effective, for the diameter of the joint is small and any pressure tends to tighten same. The use of a gasket at 21 enables the joint to be repaired or tightened at any time, or the gasket may be removed. Where the joint at 21 is depended upon for tightness, a tight fitting nut 12 or an oil proof paint or wax between the nut and thread 8 is necessary, or it is possible to prevent leakage along the thread by making a tight fit between the top face of the nut 12 and the weather cap 13 by a gasket or other means.

This latter method is usually objectionable, as the nut may lock with the cap and back off when the cap 13 is removed. This might permit the twisting of the lead unless a long socket is provided at 10 to engage the meshing section of the conductor 7, the meshing section preventing rotation and the shoulder on the member 7 limiting the upward movement of the conductor or lead 6 and preventing same being pulled loose below. If the lead is free to rotate, or is not drawn up to a definite point, the lower end of the lead may be displaced and cause breakdown.

I claim:

1. A bushing insulator comprising a dielectric member having an opening for the passage of a conductor therethrough, a continuous conductor extending through said opening and having a non-circular portion and a shoulder thereon, a metal sleeve secured to said dielectric member within said opening, and having a non-circular passage engaging the non-circular portion of said conductor and having a stop portion engaging the shoulder on said conductor to limit outward movement of said conductor, an imperforate cover threaded on said conductor and closing said opening and yielding packing interposed directly between said cover and dielectric member and having its opposite faces engaging said cover and said dielectric member respectively, said packing serving to limit the movement of said cover toward said dielectric member and thus exert pressure on the threaded connection between said cover and conductor.

2. In a bushing insulator, an elongated dielectric member having an opening extending longitudinally therethrough, a conductor extending through said opening and projecting from the upper end thereof, said conductor having a non-circular portion and a shoulder, a metal sleeve fixed within the opening of said bushing and engaging the non-circular portion of said conductor and said shoulder for holding said conductor against rotation and against longitudinal movement relative to said dielectric member, a cover for closing the opening of said dielectric member, said cover and dielectric member having registering abutment portions, a compression gasket interposed between said abutment portions, threaded connection between said cover and conductor for forcing said cover against said gasket to form a tight joint between said cover and dielectric member and to provide electrical connection between said cover and conductor, and means for attaching a conductor lead to said cover.

3. In a bushing insulator, an elongated tubular dielectric member having an opening therethrough, a conductor extending through said opening, means adjacent the outer end of said opening for limiting the outward movement of said conductor, a nut threaded on the projecting end of said conductor, means for preventing rotation of said conductor in said opening, an imperforate cap threaded on the end of said conductor and having clearance for said nut, said cap making a tight joint with said dielectric member to close said opening, and means for securing a line to the end of said conductor to hold said conductor while said dielectric member is removed therefrom.

4. The combination with a bushing insulator, of a conductor having a threaded end projecting therefrom, and a terminal member threaded on said conductor, said conductor having a slight initial bend in the threaded portion thereof within the portion of said terminal member threaded on to said conductor to insure a tight fit between said conductor and terminal member.

5. The combination with a bushing insulator, of a conductor having a threaded portion projecting therefrom, means within said insulator for holding said conductor against rotation and an imperforate cover cap having an elongated socket threaded on the projecting portion of said conductor, said conductor having an initial bend in the threaded portion thereof, disposed within said socket to insure a tight connection between said conductor and cover cap.

6. An insulator for use with a casing wall comprising a bushing insulator extending through an opening in said wall, means for forming a tight joint between said wall and bushing insulator, said bushing insulator having an opening therethrough, a conductor arranged within said opening and having an angular portion adjacent the outer end thereof, a sleeve secured within said opening adjacent the outer end of said bushing insulator and having an angular socket for receiving the angular portion of said conductor, said sleeve and conductor having shoulders for limiting the outward movement of said conductor, a nut threaded on the end of said conductor and engaging the outer end of said sleeve, an imperforate cap threaded on said conductor outside of said nut and having clearance for said nut, a gasket interposed between said cap and the end of said bushing insulator, and means for attaching a line to the end of said conductor to hold said conductor while said bushing is being installed or removed.

In testimony whereof I have signed my name to this specification on this 25th day of July, A. D. 1922.

ARTHUR O. AUSTIN.